Aug. 11, 1931.  E. E. EATON  1,818,610

CLUTCH MEMBER

Filed May 31, 1928

INVENTOR.
Ernest E. Eaton
BY
ATTORNEYS.

Patented Aug. 11, 1931

1,818,610

UNITED STATES PATENT OFFICE

ERNEST E. EATON, OF SYRACUSE, NEW YORK, ASSIGNOR TO BROWN-LIPE GEAR COMPANY, OF SYRACUSE, NEW YORK, A CORPORATION OF NEW YORK

CLUTCH MEMBER

Application filed May 31, 1928. Serial No. 281,847.

This invention relates to friction clutches as disk clutches, single plate clutches and the like and has for its object, a clutch member comprising inner and outer parts and a particularly simple and efficient yielding means for transmitting the torque from one part to the other.

The invention consists in the novel features and in the combinations and constructions hereinafter set forth and claimed.

In describing this invention, reference is had to the accompanying drawings in which like characters designate corresponding parts in all the views.

Figure 1:
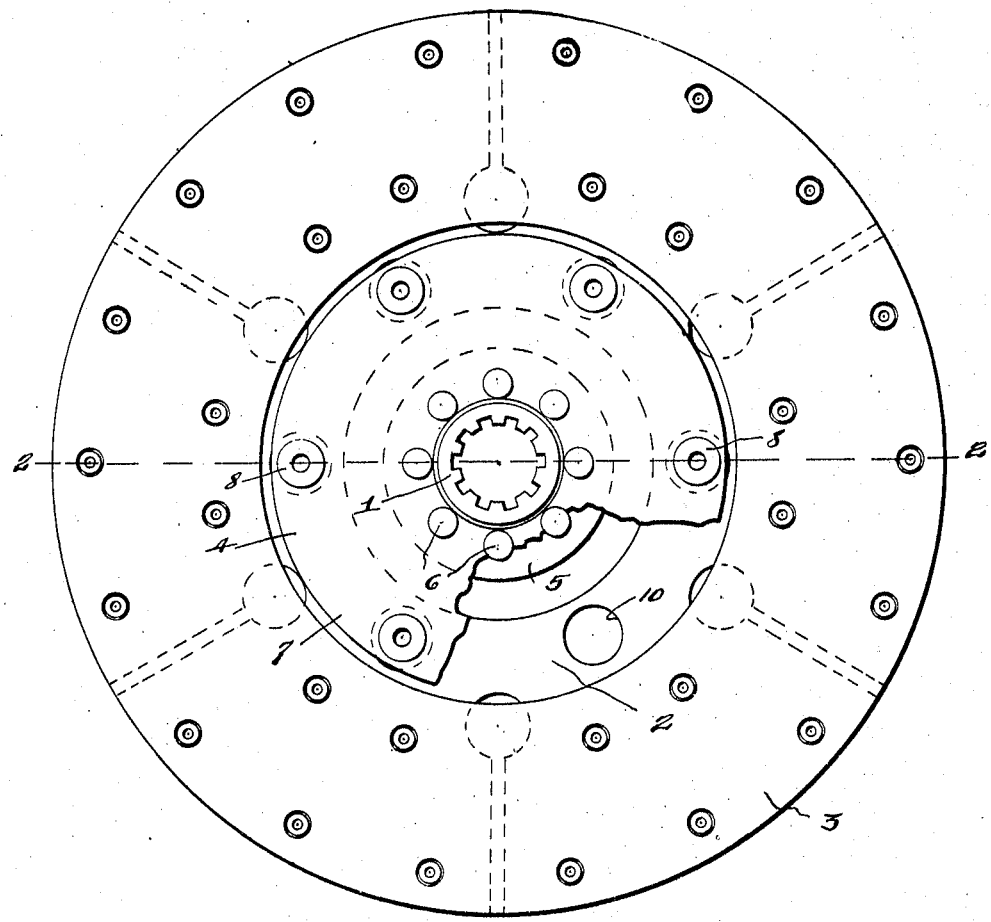
Figure 1 is an elevation, partly broken away, of a clutch member embodying my invention.
Figure 2:
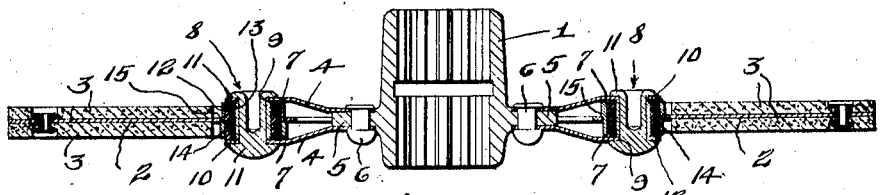
Figure 2 is a sectional view on line 2—2, Figure 1.

The clutch member here shown is of the single plate type and is designed to be used as the driven member in a single plate clutch.

The clutch member includes a hub 1, inner and outer elements, the inner element being secured to the hub to rotate therewith and one of the elements here illustrated, as the inner element which is secured to the hub comprising spaced apart disks and the outer element, a plate extending between the disks, driving studs carried by the disks extending transversely through the plate and the disks and bushings of yielding material around the studs for yieldingly transmitting the torque from the plate to the disks and vice versa.

2 designates the annular plate which is spaced apart from the hub 1 concentric therewith, the plate being provided with friction disks 3 on opposite sides thereof for coacting with the driving clutch member and a pressure ring not shown.

4 are members or disks forming the element which rotates with the hub 1, these disks being secured to opposite sides of an annular flange 5 on the hub as by rivets 6. The disks diverge outwardly and have their outer margins 7 spaced apart. The inner margin of the plate 2 extends between the outer margins 7 of the disks 4. That is, the inner margin of the plate 2 and the outer margins of the disks 4 lap each other and are spaced apart.

8 designates the driving studs which are here shown as rivets fitting holes 9 in the margins 7 of the disks 4 and extending through holes 10 in the inner margin of the plate 2. The studs or rivets have heads 11 overlying the outer face of the disks 4. The holes 10 are alined with and of greater diameter than the studs or rivets.

12 are bushings of yielding material as rubber around the studs, the bushings abutting at their ends against the inner faces of the disks 4. These bushings are encased in inner and outer sleeves 13, 14, the inner sleeves fitting the studs 8 and abutting at their ends against the margins 7 of the disks 4. The outer sleeves 14 fit the holes 10. The sleeves hold the bushings from undue distortion and the outer sleeves protect the bushings against shearing. The bushings are confined by the sleeves and the margins 7 of the disks 4. The sleeves 14 are provided with means as annular shoulders 15 coacting with the walls around the holes 10 of the intermediate element or plate 2 to hold the plate from substantial axial movement, the shoulders 15 of alternate sleeves 14 facing in opposite directions and bearing against opposite faces of the plate 2. The bushing and sleeves are assembled as a unit before being assembled with the plate 2, disks 4 and the studs 8.

In operation, the rubber filler 12 transmits the torque and absorbs noises and vibrations that may be transmitted from the plate 2 to the hub 1 or vice versa.

What I claim is:

1. A friction clutch member comprising a hub, a friction plate concentric with the hub, means for connecting the hub and the plate to transmit the torque from one to the other comprising an element secured to the hub and rotatable therewith and lapping the margin of the plate and spaced apart therefrom, driving studs extending transversely through the lapping portions, outer metal sleeves fitting the holes in the margin of the plate through which the studs extend and bushings of yielding material around the studs and fitting the sleeves.

2. A friction clutch member comprising a hub, a friction plate concentric with the hub, means for connecting the hub and the plate to transmit the torque from one to the other comprising an element secured to the hub and rotatable therewith and lapping the margin of the plate and spaced apart therefrom, driving studs extending transversely through the lapping portions outer metal sleeves fitting the holes in the margin of the plate through which the studs extend, inner metal sleeves fitting the studs and bushings of yielding material between the sleeves.

3. A friction clutch member comprising a hub, an annular element concentric with the hub and spaced apart therefrom, a second annular element secured to the hub and rotatable therewith the inner and outer margins of said elements respectively lapping each other with their lapping portions spaced apart and one of the elements comprising a pair of opposing disks extending on opposite sides of and spaced apart from the other element, the elements having alined holes in their lapping portions and the holes in the intermediate element being of greater diameter than the holes in the other element, studs extending through said holes and connecting said disks and bushings of yielding material around the studs the bushings extending through the holes in the intermediate plate.

4. A friction clutch member comprising a hub, an annular element concentric with the hub and spaced apart therefrom, a second annular element secured to the hub and rotatable therewith the inner and outer margins of said elements respectively lapping each other with their lapping portions spaced apart and one of the elements comprising a pair of opposing disks extending on opposite sides of and spaced apart from the other element, the elements having alined holes in their lapping portions and the holes in the intermediate element being of greater diameter than the holes in the other elements, studs extending through said holes and connecting said disks, sleeves fitting the holes in the intermediate element, sleeves surrounding the studs and abutting at their ends against the opposing disks and bushings of yielding material between the sleeves.

5. A friction clutch member comprising a hub, an annular element concentric with the hub and spaced apart therefrom, a second annular element secured to the hub and rotatable therewith the inner and outer margins of said elements respectively lapping each other with their lapping portions spaced apart and one of the elements comprising a pair of opposing disks extending on opposite sides of and spaced apart from the other element, the elements having alined holes in their lapping portions and the holes in the intermediate element being of greater diameter than the holes in the other element, studs extending through said holes and connecting said disks, sleeves fitting the holes in the intermediate element, sleeves surrounding the studs and abutting at their ends against the opposing disks and bushings of yielding material between the sleeves, the studs having heads at their ends overlying the margins around the holes in the disk.

6. A friction clutch member comprising a hub, an annular element concentric with the hub and spaced apart therefrom, a second annular element secured to the hub and rotatable therewith, the inner and outer margins of said elements respectively lapping each other with their lapping portions spaced apart and one of the elements comprising a pair of opposing disks extending on opposite sides of and being spaced apart from the other element, the elements having alined holes in their lapping portions and the holes in the intermediate element being of greater diameter than the holes in the other element, studs extending through said holes and connecting said disks, sleeves fitting the holes in the intermediate element, sleeves surrounding the studs and abutting at their ends against the opposing disks and bushings of yielding material between the sleeves, the outer sleeves having means for preventing substantial axial movement of the intermediate element.

7. A friction clutch member comprising a hub, an annular element concentric with the hub and spaced apart therefrom, a second annular element secured to the hub and rotatable therewith, the inner and outer margins of said elements respectively lapping each other with their lapping portions spaced apart and one of the elements comprising a pair of opposing disks extending on opposite sides of and spaced apart from the other element, the elements having alined holes in their lapping portions and the holes in the intermediate element being of greater diameter than the holes in the other element, studs extending through said holes and connecting said disks, sleeves fitting the holes in the intermediate element, sleeves surrounding the studs and abutting at their ends against the opposing disks and bushings of yielding material between the sleeves, the outer sleeves having means for preventing substantial axial movement of the intermediate element and the studs having heads overlying the outer faces of said disks.

8. A friction clutch member comprising a hub, disks mounted on the hub and having their outer margins spaced apart, an annular plate concentric with the hub and having its margin extending between the spaced apart portions of the disks, and provided with sleeves on said margin, studs connecting the spaced apart portions of the disks and extending through holes in the sleeves of the plate, said holes being of greater diameter than the studs and bushings of yielding material around the studs and located in the holes in the sleeves of the outer plate.

In testimony whereof, I have hereunto signed my name, at Syracuse, in the county of Onondaga, and in the State of New York, this 29th day of May, 1928.

ERNEST E. EATON.